United States Patent
Balachandran et al.

(10) Patent No.: US 6,990,104 B1
(45) Date of Patent: Jan. 24, 2006

(54) METHODS AND DEVICES FOR SCHEDULING TRANSMISSIONS IN INTERFERENCE-LIMITED NETWORKS

(75) Inventors: Krishna Balachandran, Middletown, NJ (US); Kirk K. Chang, Morganville, NJ (US); Sanjiv Nanda, Clarksburg, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 594 days.

(21) Appl. No.: 09/632,215

(22) Filed: Aug. 3, 2000

(51) Int. Cl.
*H04L 12/28* (2006.01)
(52) U.S. Cl. .............................. 370/395.42
(58) Field of Classification Search ............ 370/322, 370/347, 348, 449, 455, 252, 329, 333, 342, 370/462, 468, 538; 455/450, 451, 452.1, 455/63.1, 67.14, 512; 375/224, 225
See application file for complete search history.

(56) References Cited

U.S. PATENT DOCUMENTS

| | | | | |
|---|---|---|---|---|
| 5,640,395 A | * | 6/1997 | Hamalainen et al. | 370/322 |
| 6,049,549 A | * | 4/2000 | Ganz et al. | 370/449 |
| 6,091,947 A | * | 7/2000 | Sumner | 455/413 |

* cited by examiner

*Primary Examiner*—Bob Phunkulh
*Assistant Examiner*—Robert W. Wilson

(57) ABSTRACT

Uplinked and downlinked transmissions in an interference-limited system, such as a cellular network, are prioritized and authorized by channel quality/data rate to minimize interference.

20 Claims, 1 Drawing Sheet

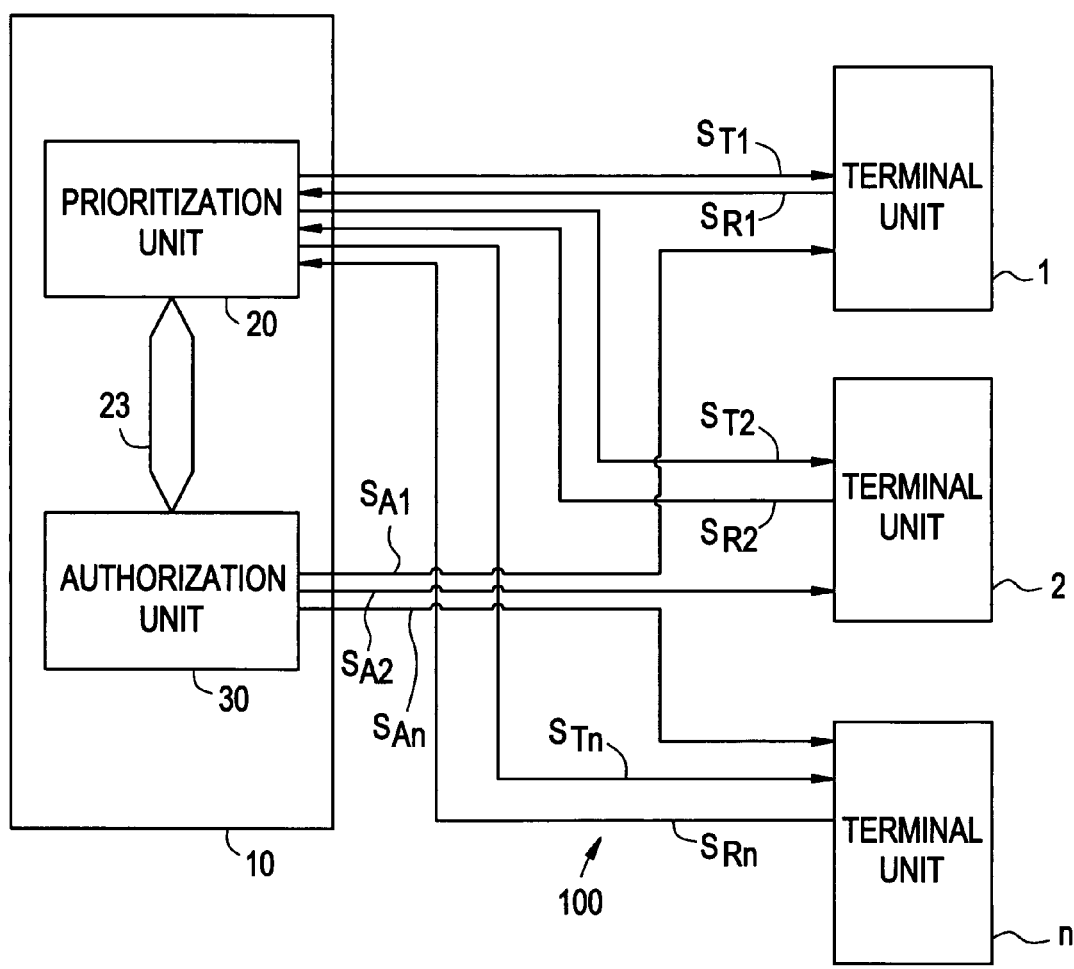

US 6,990,104 B1

METHODS AND DEVICES FOR SCHEDULING TRANSMISSIONS IN INTERFERENCE-LIMITED NETWORKS

BACKGROUND OF THE INVENTION

Interference-limited systems have proliferated in recent years. These systems give users the convenience of real-time communications without the physical constraints of dedicated lines. In these systems, the data rate that can be achieved is dependent upon the amount of interference with a "transmission" (e.g., a cellular telephone call). The amount of interference is reflected in the quality of the channel ("channel quality"). The channel quality for a given transmission depends upon several factors, including path loss between a base station (e.g., a cell) and a terminal unit (e.g., a cellular phone), and interference from other transmissions within the same network.

Channel quality metrics such as the carrier-to-interference ratio (the "C/I ratio"), the bit error probability, and the coefficient of variation of the bit error probability, are often used as indicators of the data rate that can be achieved in a given transmission. Higher data rates can be achieved when the channel quality improves, e.g., at higher C/I values.

While interference is a limiting factor, the bandwidth available to these systems is also limited. When there is more than one user competing for part of the available bandwidth, methods and devices must be devised which allocate bandwidth efficiently and appropriately. Typically, users will be competing for bandwidth when they seek to send or receive transmissions at substantially the same time. For example, before uplinking, competing users will typically request authorization to transmit. Similarly, before downlinking, a base station controls transmissions to be sent to competing users. Any method must prioritize both uplink and downlink transmissions. Taking various factors into consideration, uplinked and downlinked transmissions can be authorized in accordance with a prioritization schedule or the like.

Prior to proceeding, it should be understood that the word "scheduling" may mean prioritizing, authorizing, or some combination of the two.

Scheduling methods have been the subject of significant study. A number of methods have been proposed, including "first-in-first-out," "weighted fair queuing," "round-robin scheduling," and "virtual clock." Under existing methods, users transmitting over channels whose channel quality is low are not penalized, but are protected and given a fair share of the bandwidth. These "fairness methods" are designed to allocate additional transmission time to users transmitting via such channels in order to allow the transmission of approximately the same amount of data as users making use of channels whose quality is much higher.

In developing these fairness methods, however, it has been assumed that the link level characteristics of each user's channel are independent of the scheduling method used. This assumption, though, neglects to account for the fact that the scheduling method has a considerable impact on the channel quality (i.e., achievable data rate) achieved by each user. That is, when a user is transmitting, the transmission itself causes interference to other transmissions. As a result, the longer such a user is transmitting, the more interference other users experience. Because the amount of interference is dependent upon the scheduling method, other users' achievable data rates will be reduced, which in turn increases the amount of time they spend transmitting, ultimately causing even more interference to other users.

Accordingly, it is desirable to provide methods and devices for authorizing transmissions in interference-limited networks that take into account the interdependence between scheduling and interference.

Other desirable features will become apparent to those skilled in the art from the following description taken in conjunction with the accompanying drawings and claims.

SUMMARY OF THE INVENTION

In accordance with the present invention there are provided devices and methods for scheduling transmissions in an interference-limited network. Such methods and devices envision a device adapted to prioritize uplinked transmission request signals based on achievable data rates. The device is further adapted to assign a highest priority to a transmission request signal associated with a highest achievable data rate. Such devices may comprise a bandwidth allocation unit or one of a number of different multiplexers.

Further, the device is adapted to authorize a terminal unit associated with the highest achievable data rate to send an uplinked transmission.

Similarly, the present invention envisions the same or a different device which is adapted to prioritize downlinked, transmission test signals based on achievable data rates. Thereafter, the device is adapted to assign a highest priority to a transmission test signal associated with a highest achievable data rate, and authorize a downlinked transmission to a terminal unit associated with the highest achievable data rate.

The present invention and its advantages can be best understood with reference to the drawings, detailed description of the invention, and claims that follow.

BRIEF DESCRIPTION OF THE DRAWINGS

FIG. 1 depicts a device adapted to schedule transmissions in an interference-limited system by taking into account the interdependence between scheduling and interference according to one embodiment of the present invention.

DETAILED DESCRIPTION OF THE INVENTION

FIG. 1 shows an interference-limited communication network 100 comprising a control device or means 10, and a plurality of terminal units 1, 2, ..., n. Of course, FIG. 1 does not show all of the component parts of a communication network. It should be understood that the control device 10, and the plurality of terminal units 1, 2, ..., n are only some of the parts making up such a network.

In an illustrative embodiment of the present invention, the device 10 is adapted to schedule transmissions in an interference-limited network, giving priority to a transmission request signal $S_{Rj}$ (where $1 \leq j \leq n$) associated with the highest achievable data rate. The device 10 is further adapted to give priority to a transmission test signal $S_{TK}$ (where $1 \leq k \leq n$) also associated with a highest achievable data rate. It should be noted that j, k are not necessarily the same because uplink and downlink behavior can be different.

As shown in FIG. 1, the device 10 comprises a prioritization unit or means 20, and an authorization unit or means 30. Though shown as separate units, these units may be combined into a single unit. Likewise, they may be further broken down into additional units that perform substantially the same functions and operate in substantially the same manner as the separate units. Though referred to as a control device, it should be understood that this is arbitrary. The device 10 may be called by various names without departing from the spirit and scope of the present invention so long as it functions to authorize transmissions in an interference-limited network. It should be understood that by authorizing transmissions according to a channel's data rate, the device 10 inherently allocates bandwidth as well. In alternative embodiments of the invention, the device 10 may comprise a bandwidth allocation unit, a frequency division multiplexer, a time division multiplexer, or a code division multiplexer to name just a few examples.

In addition, it should also be noted that the present invention is not limited to cellular networks or to any particular frequency band, but rather is applicable to any shared-media network or frequency in which one transmission may cause interference to another transmission. In alternative embodiments of the invention, the network may transmit in the radio, microwave, wireless LAN, or infrared frequencies.

Regardless of the frequency employed in the communication network 100, metrics regarding the channel quality (i.e., achievable data rate), including the C/I ratio, the bit error probability, and the coefficient of variation of the bit error probability, are routinely measured by methods known in the art, and reported to the control device 10. In the discussion which follows, and for purposes of the present invention, the terms achievable data rate and channel quality will be used interchangeably and have the same meaning; more of a given signal is allowed to pass through a given channel.

One example of how the device 10 operates to prioritize and authorize uplink transmissions is as follows.

In an illustrative embodiment of the invention, a terminal unit 1 sends a transmission request signal $S_{R1}$ to the control device 10. Additionally, and at substantially the same time, a second terminal unit 2 sends a request signal $S_{R2}$ to the control device 10. Furthermore, any number of terminal units, up to terminal unit n, may send a request signal $S_{Rn}$ to the control device 10 at substantially the same time.

Using means known in the art, the device 10 is adapted to receive the request signals $S_{R1}$, $S_{R2}$ . . . . $S_{Rn}$. A terminal unit 1, 2 . . . . n sends a request signal when it needs to send a transmission. In an illustrative embodiment of the invention, the prioritization unit 20 is adapted to prioritize the request signals $S_{R1}$, $S_{R2}$ . . . . $S_{Rn}$ based on the achievable data rate associated with each request signal. More specifically, the prioritization unit 20 is adapted to assign a priority to each request signal based on the data rates associated with each request signal, for example, assigning the highest priority to the request signal $S_{Rn}$ associated with the highest achievable data rate.

Thereafter, authorization unit 30 is adapted to send an authorization signal $S_{An}$ to a terminal unit n according to the assigned priorities. In an illustrative embodiment of the invention, the authorization unit 30 is adapted to send the authorization signal $S_{An}$ to the terminal unit n associated with the highest assigned priority (i.e., the highest achievable data rate). Upon receiving an authorization signal $S_{An}$, the terminal unit n is then authorized to send a terminal transmission to a receiver (not shown) within the network 100. In an illustrative embodiment of the invention, the control device 10 is separate from such a receiver. In an alternative embodiment, a control device 10 envisioned by the present invention comprises a receiver.

Substantially after this is completed, the authorization unit 30 is adapted to generate authorization signals $S_{A1}$, $S_{A2}$, . . . $S_{An}$ to authorize the remaining terminal units 1, 2 . . . n to send transmissions to receivers within the network 100 according to their priority.

Though the examples above and below use the highest achievable data rate as the highest priority, the invention is not so limited. Any data rate (and, therefore, terminal unit) may be assigned the highest (i.e., first) priority.

In an illustrative embodiment of the invention, one example of how the device 10 operates to prioritize and authorize downlink transmissions is as follows. Before beginning, it should be understood that the device 10 may authorize downlink transmissions to different terminal units 1, 2 . . . . n than were authorized to uplink transmissions.

Referring again to FIG. 1, the device 10 is adapted to authorize transmissions in an interference-limited network 100. Using means known in the art, the device 10 is adapted to send transmission test signals $S_{T1}$, $S_{T2}$, . . . $S_{Tn}$ to the terminal units 1, 2, and n. In an illustrative embodiment, the prioritization unit 20 is adapted to prioritize the transmission test signals $S_{T1}$, $S_{T2}$ . . . $S_{Tn}$ based upon achievable data rates associated with each signal. More specifically, the prioritization unit 20 is adapted to assign a priority to each transmission test signal, for example, assigning the highest priority to the transmission test signal $S_{Tn}$ associated with the highest achievable data rate.

Thereafter, in an illustrative embodiment of the invention, the authorization unit 30 is further adapted to authorize transmissions to a terminal unit n associated with the highest assigned priority (e.g., the highest achievable data rate).

Similar to before, once a transmission to the terminal unit associated with the highest priority is completed, the authorization unit 30 is adapted to authorize transmissions to the remaining terminal units 1, 2 . . . n based on their assigned priority.

In an alternative embodiment of the present invention, the prioritization unit 20 is further adapted to periodically poll the signal channel quality associated with one or all of the active terminal units 1, 2, . . . , n in order to update channel quality metrics. This allows the signal channel quality of the channel associated with each terminal unit n to be dynamically monitored. Thereafter, the unit 20 can be adapted to adjust priorities of one or all of the

What is claimed is:

1. A device for scheduling transmissions in an interference-limited network comprising:
   a prioritization unit adapted to assign a priority to each downlink transmission test signal sent to a terminal unit based on an achievable data rate associated with each test signal; and
   an authorization unit adapted to schedule transmissions to the terminal units based on the priority of the test signals.

2. The device as in claim 1 wherein the prioritization unit is further adapted to assign a plurality to each uplink transmission request signal received from the terminal units based on achievable data rates.

3. The device as in claim 2 wherein the prioritization unit is further adapted to assign a highest priority to a transmission request signal associated with a highest achievable data rate.

4. The device as in claim 3 wherein the authorization unit is further adapted to authorize a terminal unit associated with the highest achievable data rate to send a transmission.

5. The device as in claim 2 wherein the authorization unit is further adapted to authorize a terminal unit to send a transmission based on its assigned priority.

6. The device as in claim 2, wherein the prioritization unit is further adapted to periodically poll a data rate associated with a terminal unit within the network.

7. The device as in claim 6 wherein the prioritization unit is further adapted to adjust an assigned priority associated with the terminal unit based on the polled data rate.

8. The device as in claim 1, wherein the prioritization unit is further adapted to assign a highest priority to a transmission test signal associated with a highest achievable data rate.

9. The device as in claim 8 wherein the authorization unit is further adapted to authorize a transmission to a terminal unit associated with the highest achievable data rate.

10. The device as in claim 1 wherein the device comprises a bandwidth allocation unit.

11. The device as in claim 1 wherein the device further comprises a multiplexer.

12. A method for scheduling transmissions in an interference-limited network comprising:
sending a downlink transmission test signal to terminal units;
assigning a priority to each transmission test signal based on an achievable data rate associated with each test signal; and
scheduling transmissions to terminal units based on the priority of the transmission test signals.

13. The method as in claim 12 further comprising:
assigning a priority to each uplink transmission request signal from the terminal units based on achievable data rates.

14. The method as in claim 13 further comprising authorizing a terminal unit to send a transmission based on its assigned priority.

15. The method as in claim 13 further comprising periodically polling a data rate associated with a terminal unit within the network.

16. The method as in claim 15 further comprising adjusting an assigned priority associated with the terminal unit based on the polled data rate.

17. The method as in claim 13 further comprising assigning a highest priority to a transmission request signal associated with a highest achievable data rate.

18. The method as in claim 17 further comprising authorizing a terminal unit associated with the highest achievable data rate to send a transmission.

19. The method as in claim 12 further comprising assigning a highest priority to a transmission test signal associated with a highest achievable data rate.

20. The method as in claim 19 further comprising authorizing a transmission to a terminal unit associated with the highest achievable data rate.

* * * * *